US009781640B2

(12) United States Patent
Narayanan et al.

(10) Patent No.: US 9,781,640 B2
(45) Date of Patent: Oct. 3, 2017

(54) METHOD TO OPTIMIZE PCI CONFUSION DETECTION AND RESOLUTION

(71) Applicant: Nokia Solutions and Networks Oy, Espoo (FI)

(72) Inventors: Venkataramanan Narayanan, Huntley, IL (US); Vivek Naik, Deerfield, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 147 days.

(21) Appl. No.: 14/548,484

(22) Filed: Nov. 20, 2014

(65) Prior Publication Data

US 2016/0150453 A1 May 26, 2016

(51) Int. Cl.
| H04W 36/00 | (2009.01) |
| H04W 8/26 | (2009.01) |
| H04W 36/14 | (2009.01) |
| H04W 84/04 | (2009.01) |
| H04W 24/02 | (2009.01) |

(52) U.S. Cl.
CPC .......... *H04W 36/0061* (2013.01); *H04W 8/26* (2013.01); *H04W 24/02* (2013.01); *H04W 36/0072* (2013.01); *H04W 36/14* (2013.01); *H04W 84/045* (2013.01)

(58) Field of Classification Search
CPC ... H04W 24/02; H04W 36/0083; H04W 8/26; H04W 36/0061; H04W 36/165; H04W 36/0072; H04W 36/0088; H04W 36/14
See application file for complete search history.

(56) References Cited

U.S. PATENT DOCUMENTS

| 9,301,218 B1* | 3/2016 | Sitaram | H04W 36/0083 |
| 2012/0275315 A1* | 11/2012 | Schlangen | H04W 24/02 370/242 |
| 2013/0143555 A1* | 6/2013 | Singh | H04W 36/0077 455/434 |
| 2014/0064247 A1* | 3/2014 | Teyeb | H04W 36/0083 370/331 |

(Continued)

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Section 22.3.2a, Figure 22.3.2a-1 and Section 22.3.3, Figure 22.3.3-1", 3GPP TS 36.300 V12.3.0, Sep. 2014, 5 pgs.

(Continued)

*Primary Examiner* — Charles Appiah
*Assistant Examiner* — Margaret G Mastrodonato
(74) *Attorney, Agent, or Firm* — Harrington & Smith

(57) ABSTRACT

In accordance with the exemplary embodiments of the invention there is at least a method and apparatus to perform operations of receiving, by an access node, from a user equipment a physical cell identity of a neighbor cell in a communication network; determining information including at least one of an angle of arrival and UE Rx-Tx time difference with respect to the user equipment of the communication network; and storing the determined information in a neighbor relation table to use in network operations.

20 Claims, 11 Drawing Sheets

(56) References Cited

U.S. PATENT DOCUMENTS

2014/0233457 A1\* 8/2014 Koutsimanis ......... H04J 11/005
  370/328

OTHER PUBLICATIONS

"3rd Generation Partnership Project; Technical Specification Group Radio Access Network; Evolved Universal Terrestrial Radio Access (E-UTRA); Requirements for support of radio resource management (Release 9), Section 10.2.1, Table 10.2.1-1", 3GPP TS36.133, V9.21.0, Sep. 2014, 3 pgs.

\* cited by examiner

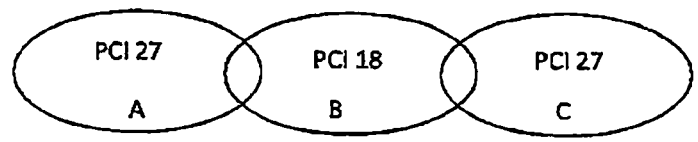
PCI Confusion - same PCI for two different neighbors of a cell
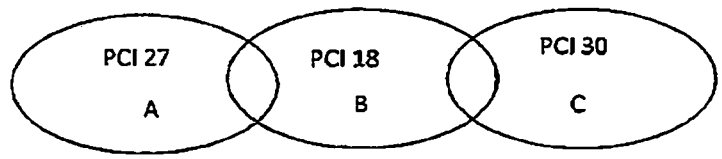
No PCI Confusion - Unique PCI for two different neighbors of a cell
FIGURE 1 --Prior Art--

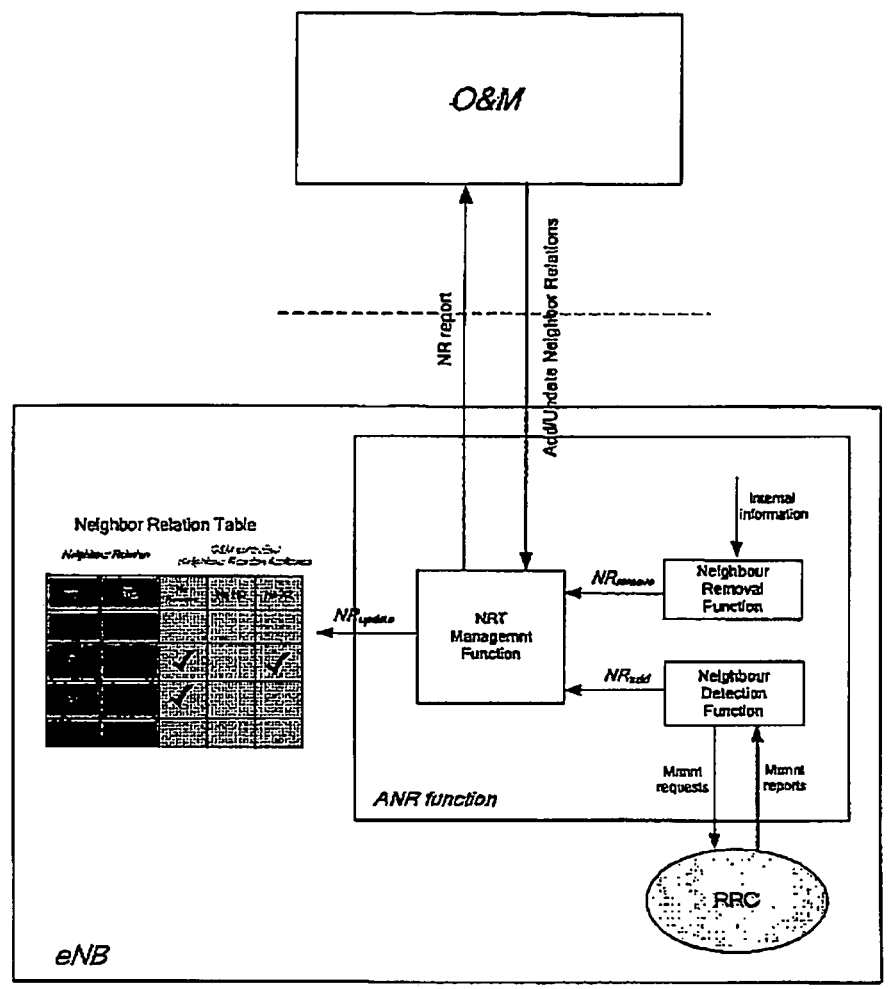
FIGURE 3A --Prior Art--

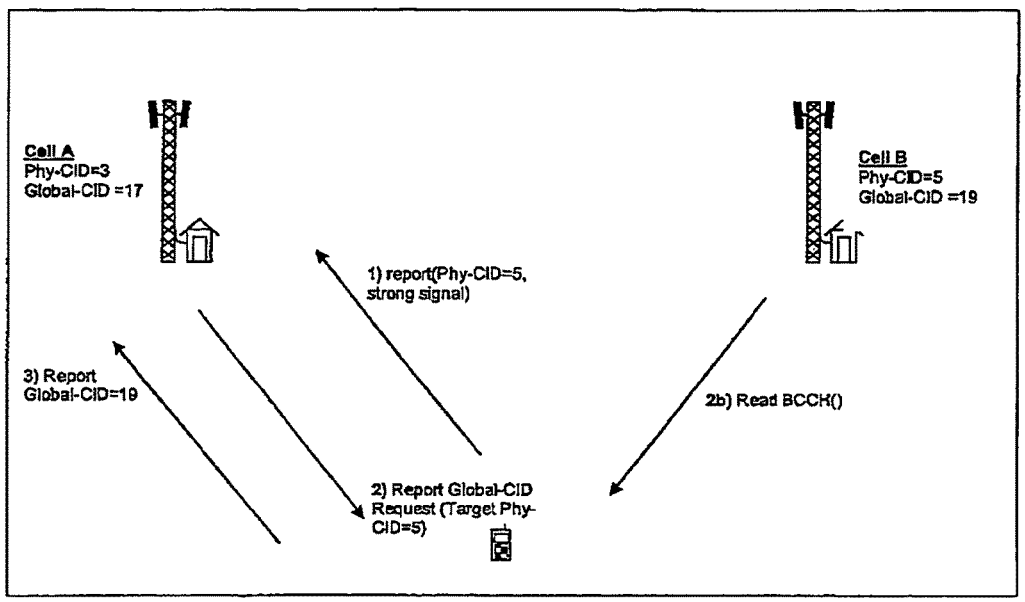
FIGURE 3B  --Prior Art--

| Reported value | Measured quantity value | Unit |
|---|---|---|
| AOA_ANGLE_000 | 0 ≤ AOA_ANGLE < 0.5 | degree |
| AOA_ANGLE_001 | 0.5 ≤ AOA_ANGLE < 1 | degree |
| AOA_ANGLE_002 | 1 ≤ AOA_ANGLE < 1.5 | degree |
| ... | ... | ... |
| AOA_ANGLE_717 | 358.5 ≤ AOA_ANGLE < 359 | degree |
| AOA_ANGLE_718 | 359 ≤ AOA_ANGLE < 359.5 | degree |
| AOA_ANGLE_719 | 359.5 ≤ AOA_ANGLE < 360 | degree |

FIGURE 4B   --Prior Art--

METHOD TO OPTIMIZE PCI CONFUSION DETECTION AND RESOLUTION

TECHNICAL FIELD

The teachings in accordance with the exemplary embodiments of this invention relate generally to operations to improve handover performance and, more specifically, relate to operations to resolve physical cell identity confusion to improve handover performance.

BACKGROUND

This section is intended to provide a background or context to the invention that is recited in the claims. The description herein may include concepts that could be pursued, but are not necessarily ones that have been previously conceived or pursued.

Certain abbreviations that may be found in the description and/or in the Figures are herewith defined as follows:
ANR automatic neighbour relation
AoA angle of arrival
BCCH Broadcast Control Channel
PDCCH Physical Dedicated Control Channel
PUCCH Physical Uplink Control Channel
ECGI enhanced cell group identity
eNB enhanced Node B
PUSCH physical uplink shared channel
BNB home node B
HeNB home enhanced node B
TAC Tracking area code
OAM operations, administration and maintenance
PCI physical cell identity
PLMN public land mobile network
RAC routing area code
RRC radio resource control
SON self-optimizing network
TA timing advance
TDD time division duplex
TX transmit
UL uplink
RX receive In Radio access technologies, typically a unique identifier (PCI) is used to identify a cell uniquely in a geographical area. The number of unique available PCI is limited due to the need of orthogonal neighboring PCIs. The PCI serves as the primary identifier for handover procedures. During mobility when neighboring cells measurements are performed by the UE, the UE reports a radio measurement for each PCI it can see. The eNB uses the PCI to map to the matching neighboring cell (EGCI). Then the eNB prepares and initiates handover to the target cell identified by the ECGI. In order to allow successful handovers, the PCI allocation in a neighborhood has to fulfil the condition of confusion-free (i.e., each neighboring ECGI should have a unique PCI value assigned).

If there is PCI confusion (the serving cell of the UE has two neighbors with the same PCI), there is ambiguity in resolving reported PCI to the target cell (ECGI) required by the UE for the handover. If the PCI confusion is left unresolved, then it can lead to handover failures to the target cells. At least user experience is degraded unless the handovers are adapted to work even when PCI confusion exists. Present day standards do support methods to perform PCI confusion detection. Resolving PCI confusion requires the eNB to detect the PCI confusion and perform procedures to resolve the PCI confusion, however the procedures are complex and require operator intervention.

Over time as networks become denser with the introduction of small cells such as Femto cells etc., PCI confusion has become more prevalent. Further PCI confusion resolution can become more complex as the density increases and take longer duration to resolve. Presently standard defined methods to improve handover success rate when PCI confusion exists can result in degradation of user throughput, possible radio loss at the UE and impact to UE battery life as the network tries to adapt HOs to work with PCI confusion.

The example embodiments of the invention as described below work to address at least the issues related to PCI confusion as described above.

SUMMARY

In an exemplary aspect of the invention, there is a method comprising identifying, by an access node, a neighbor cell in a communication network; in response to the identifying, determining information comprising at least one of an angle of arrival and a UE Rx-Tx time difference with respect to a user equipment when reporting a neighbor cell; and storing the determined information in a network relation table to use in network operations.

In another exemplary aspect of the invention, there is an apparatus comprising at least one processor; and at least one memory including computer program code, where the at least one memory and the computer program code are configured, with the at least one processor, to cause the apparatus to at least: identify a neighbor cell of a communication network; in response to the identifying, determine information comprising at least one of an angle of arrival and a UE Rx-Tx time difference with respect to a user equipment when reporting a neighbor cell; and store the determined information in a network relation table to use in network operations.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1 shows illustrative examples of PCI confusion and No PCI confusion;

FIG. 3A shows FIG. 22.3.2*a*-1 of 3GPP TS 36.300: Interaction between eNB and O&M due to ANR;

FIG. 3B shows FIG. 22.3.3-1 of 3GPP TS 36.300: Automatic Neighbour Relation Function;

FIG. 4B shows an AoA definition in 3GPP;

DETAILED DESCRIPTION

In this invention, we propose an enhanced method and apparatus to improve handover performance metrics and user experience in deployment with PCI confusion scenarios.

FIG. 1 illustrates a general diagram showing three cells A, B, and C wherein cell B may be a source cell for a handover. As shown in to top diagram of FIG. 1 the cell B includes its own PCI 18, whereas both cells A and C have a same reported PCI of 27. In this scenario there is PCI confusion for a handover. In the bottom diagram of FIG. 1 each of cells A and C have a different reported PCI of 27 and 30, respectively. Thus, in this scenario there should not be PCI confusion for a handover. The exemplary embodiments of the invention provide a solution such as for the case where there can be PCI confusion during a handover.

In accordance with an exemplary embodiment of the invention, in order to address PCI confusion a neighbor relation table will also include AoA and UE Rx-Tx Timing difference measured for a UE reporting the neighbor cell. This additional information can be used to the benefit of operators of self-optimizing networks for example to overcome issues associated with PCI confusion.

Figure 2:
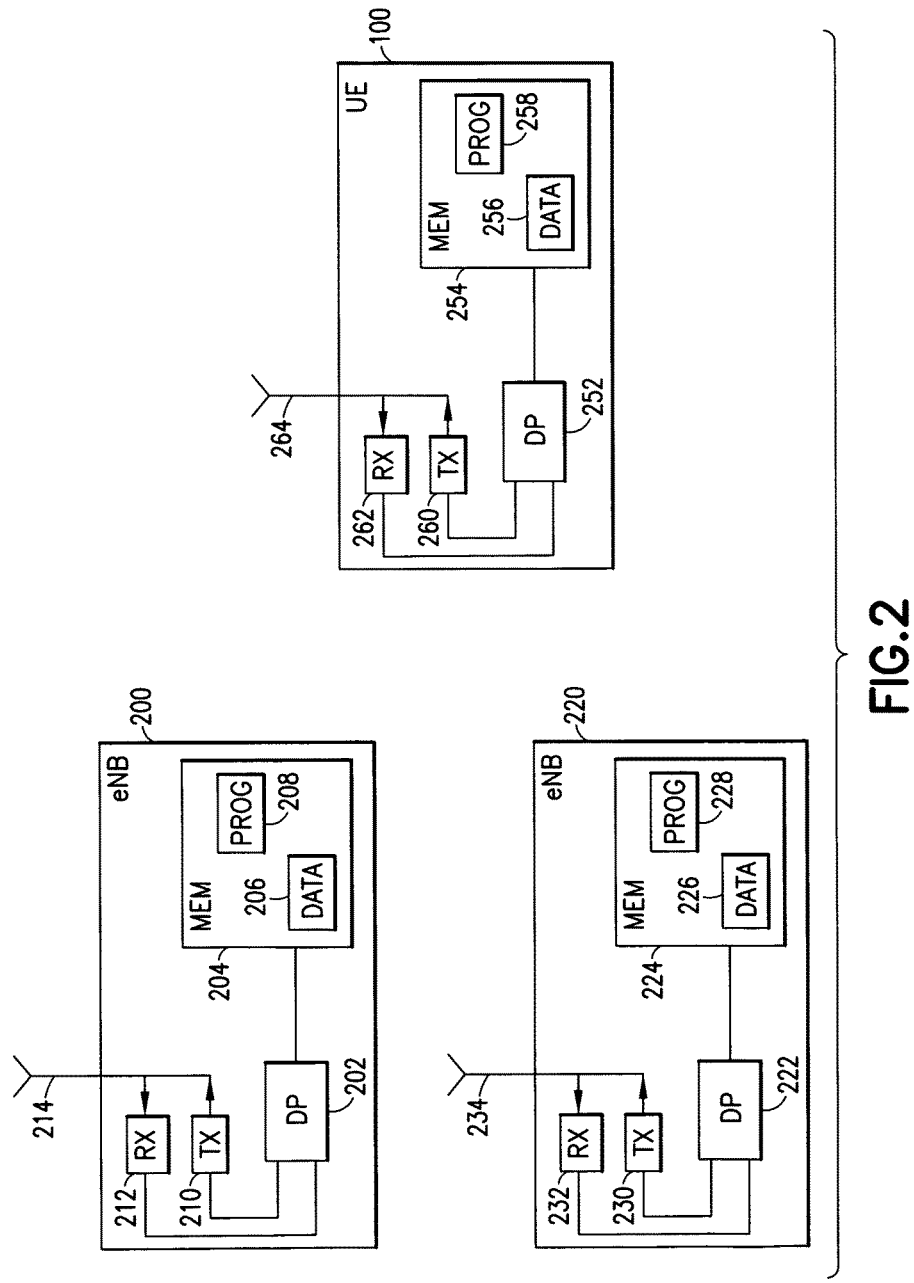
FIG. 2 shows a simplified block diagram of devices configured to perform operations in accordance with the exemplary embodiments of the invention.

Before describing the exemplary embodiments of the invention in further detail reference is now made to FIG. 2. FIG. 2 illustrates a simplified block diagram of base stations such as eNB 200 and eNB 220, and a user device, such as a UE 100, suitable for use in practicing the exemplary embodiments of this invention. In FIG. 2 apparatuses, such as the eNB 200 and the eNB 220, are adapted for communication with other apparatuses having wireless communication capability, such as the UE 100 and one another.

The eNB 200 includes processing means such as at least one data processor (DP) 202, storing means such as at least one computer-readable memory (MEM) 204 storing data 206 and at least one computer program (PROG) 208 or other set of executable instructions, communicating means such as a transmitter TX 210 and a receiver RX 212 for bidirectional wireless communications with the UE 250 via an antenna 214.

The eNB 220 includes processing means such as at least one data processor (DP) 222, storing means such as at least one computer-readable memory (MEM) 224 storing data 226 and at least one computer program (PROG) 228 or other set of executable instructions, communicating means such as a transmitter TX 230 and a receiver RX 232 for bidirectional wireless communications with the UE 100 via an antenna 234.

The UE 100 includes processing means such as at least one data processor (DP) 252, storing means such as at least one computer-readable memory (MEM) 254 storing data 256 and at least one computer program (FROG) 258 or other set of executable instructions, communicating means such as a transmitter TX 260 and a receiver RX 262 for bidirectional wireless communications with the eNB 200 or the eNB 220 via one or more antennas 264. UE capable of dual connectivity may have multiple transmitters TX and receivers RX to enable simultaneous communication with eNB 200 and eNB 220.

In addition, it is noted that although FIG. 2 may only illustrate one transmitter TX and one receiver RX in the eNB 200, the eNB 220, or the UE 100 this is non-limiting in accordance with the exemplary embodiments and these devices can each be configured to simultaneously support multiple RX and/or TX communications or chains with multiple devices. In accordance with the exemplary embodiments the data 206, 226, and/or 256 may include data required to implement a method and operate an apparatus in accordance with the exemplary embodiments of the invention.

Further, the antenna 214, 234, and/or 264 as shown in FIG. 2 can each represent a multiple antenna configuration. In a multiple antenna configuration the antenna 214, 234, and/or 264 can be used by the receivers 212, 232, and/or 262, respectively, of FIG. 2 to derive an AoA and/or Rx-Tx Timing difference for operations in accordance with the exemplary embodiments of the invention.

At least one of the PROGs 208 in the eNB 200 is assumed to include a set of program instructions that, when executed by the associated DP 202, enable the device to operate in accordance with the exemplary embodiments of this invention, as detailed above. In these regards the exemplary embodiments of this invention may be implemented at least in part by computer software stored on the MEM 204, which is executable by the DP 202 of the eNB 200, or by hardware, or by a combination of tangibly stored software and hardware (and tangibly stored firmware).

Similarly, at least one of the PROGs 228 in the eNB 220 is assumed to include a set of program instructions that, when executed by the associated DP 222, enable the device to operate in accordance with the exemplary embodiments of this invention, as detailed above. In these regards the exemplary embodiments of this invention may be implemented at least in part by computer software stored on the MEM 224, which is executable by the DP 222 of the eNB 220, or by hardware, or by a combination of tangibly stored software and hardware (and tangibly stored firmware).

Similarly, at least one of the PROGs 258 in the UE 100 is assumed to include a set of program instructions that, when executed by the associated DP 252, enable the device to operate in accordance with the exemplary embodiments of this invention, as detailed above. In these regards the exemplary embodiments of this invention may be implemented at least in part by computer software stored on the MEM 254, which is executable by the DP 252 of the UE 100, or by hardware, or by a combination of tangibly stored software and hardware (and tangibly stored firmware). Electronic devices implementing these aspects of the invention need not be the entire devices as depicted at FIG. 2 or may be one or more components of same such as the above described tangibly stored software, hardware, firmware and DP, or a system on a chip SOC or an application specific integrated circuit ASIC.

In general, the various embodiments of the UE 100 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 204, 224, and 254 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 202, 222, and 252 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The description herein should therefore be considered as merely illustrative of the principles, teachings and exemplary embodiments of this invention, and not in limitation thereof.

As similarly stated above PCI confusion may be due to the introduction of small sized cells. In a non-limiting example a typical cell size of HNB/HeNBs can be much smaller than macro cells, and there can be multiple HNBs/HeNBs within a coverage area of a source eNB that have the same PCI. This can lead to PCI confusion wherein the source eNB is unable to determine the correct target cell for handover from the PCI included in the measurement reports from the UE. The exemplary embodiments of the invention can be used to provide a solution to PCI confusion for any cell sizes including small sized cells.

In the present handovers are performed using a neighbor list and Automatic Neighbour Relation (ANR) procedures. FIG. 3A illustrates FIG. 22.3.2*a*-1 of 3GPP TS 36.300. FIG. 3A illustrates an interaction between eNB and operations/maintenance (O&M) due to ANR. As shown in FIG. 3A there is an NRT management function which receives instructions from the O&M to add/update neighbor relations. The NRT management function performs these operations using a neighbor removal function which received internal information, and a neighbor detection function which processes radio resource control management requests and reports. The NRT management function works to update a neighbor relation table or list. As shown in FIG. 3A the ANR function resides in the eNB and manages the conceptual Neighbour Relation Table (NRT). Located within ANR, the Neighbour Detection Function finds new neighbours and adds them to the NRT. ANR also contains the Neighbour Removal Function which removes outdated NRs. The Neighbour Detection Function and the Neighbour Removal Function are implementation specific. An existing Neighbour cell Relation (NR) from a source cell to a target cell means that eNB controlling the source cell knows the ECGI/CGI and Physical Cell Identifier (PCI) of the target cell and has an entry in the NRT for the source cell identifying the target cell. For each cell that the eNB has, the eNB keeps a NRT. For each NR, the NRT contains the Target Cell Identifier (TCI), which identifies the target cell. For E-UTRAN, the TCI corresponds to the E-UTAN Cell Global Identifier (ECGI) and Physical Cell Identifier (PCI) of the target cell. The ANR function can rely on cells broadcasting their identity on global level, E-UTRAN Cell Global Identifier (ECGI) and allows O&M to manage the NRT. O&M can add and delete NRs. It can also change the attributes of the NRT. The O&M system is informed about changes in the NRT.

FIG. 3B illustrates FIG. 22.3.3-1 of 3GPP TS 36.300. FIG. 3B illustrates an Intra-LTE Automatic Neighbour Relation (ANR) function. As shown in FIG. 3 the eNB serving cell A has an ANR function. As a part of the normal call procedure, the eNB instructs each UE to perform measurements on neighbor cells. The eNB may use different policies for instructing the UE to do measurements, and when to report them to the eNB. When UE discovers a new ECGI, the UE reports the detected ECGI to the serving cell eNB. In addition the UE reports the tracking area code and all PLMN IDs that have been detected. The eNB adds this neighbour relation to NRT. As shown at step 1 of FIG. 3B the UE sends a measurement report regarding cell B. This report contains Cell B's PCI but not the cell's ECGI. When the eNB receives a UE measurement report containing the PCI, the following sequence may be used. At step 2 the eNB instructs the UE, using the newly discovered PCI as parameter, to read the ECGI, the TAC and all available PLMN ID(s) of the related neighbor cell. To do so, the eNB may need to schedule appropriate idle periods to allow the UE to read the ECGI from the broadcast channel of the detected neighbor cell. At step 3 of FIG. 3B, when the UE has found out the new cell's ECGI, the UE reports the detected ECGI to the serving cell eNB. In addition the UE reports the tracking area code and all PLMN IDs that have been detected. If the detected cell is a CSG or hybrid cell, the UE also reports the CSG ID to the serving cell eNB. Then at step 4 the eNB decides to add this neighbor relation, and can use PCI and ECGI to update the Neighbor Relation List. It is noted that the eNB may differentiate an open access HeNB from the other types of (H)eNB by the PCI configuration or ECGI configuration.

It is noted that most of these ANR operations of FIG. 3B which can result from PCI confusion can be avoided using the method in accordance with the exemplary embodiments of the invention as described herein.

In general for a handover a UE reports the PCI of the target cell and the eNB uses the neighbor Relation List or NRT which is the mapping between PCI and target cell (ECGI) to find the matching target cell for the handover. It is noted that the terms neighbor relation list may be used herein in the description to refer to the NRT, or vice versa. The PCI serves as a primary identifier for handover procedures. During mobility when neighboring cells measurements are performed by the UE, the UE reports a radio measurement for each PCI it can see. The eNB uses the PCI to map to the matching neighboring cell (EGCI). In order to allow successful handovers, the PCI allocation in a neighborhood has to fulfill the condition of confusion-free (i.e.) each neighboring ECGI should have a unique PCI value assigned. Thus, duplicate entries for the same PCI would cause PCI confusion and be problematic for at least a neighbor list PCI mapping as described above. The Operator would be required to resolve the PCI confusions to uniquely identify the neighboring cells such that handovers will be successful. In the present standards to perform handover when PCI confusion exists it is required that the eNB perform a ReportCGI procedure (ANR) to resolve the ambiguity detected in the neighbor list. Following are some of the disadvantages of this method:

handover execution is delayed, thus there is a potential of radio loss of the UE;

in some cases the procedure does not work when the UE has data to send;

negative impact to user data throughput;

negative impact to UE battery life; and these procedures may not be supported in all technologies or not supported by all UEs.

The exemplary embodiments of the invention utilize at least a neighbor relation table which includes an angle of arrival (AoA) and UE Rx-Tx Timing difference for each target cell to address at least these issue and resolve physical cell identity confusion to improve handover performance.

In accordance with the exemplary embodiments, in addition to PCI a neighbor relation table will also include angle of arrival (AoA) and UE Rx-Tx Timing difference measured by the source eNB for a neighbor cell. This information can be used to resolve physical cell identity confusion to improve handover performance.

In accordance with one exemplary embodiments the AoA and/or UE Rx-Tx Timing may be manually or automatically defined in the NRT by a network operator or programmed via received signaling. Further, in accordance with another exemplary embodiment of the invention the AoA and/or UE Rx-Tx Timing may be dynamically populated into the NRT using a self-optimizing network (SON) approach as will be discussed below in further detail.

Figure 4A:
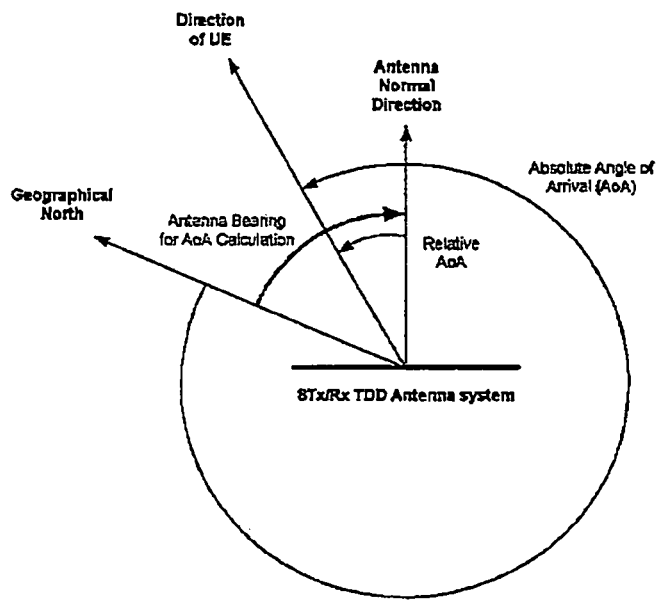
FIG. 4A shows an Angle of Arrival (AoA) measurement of UE at an eNB.

FIG. 4A illustrates an absolute angle of arrival as identified with a receiver using eight Tx/Rx TDD antenna. As shown in FIG. 4A the AoA defines the estimated angle of a user with respect to a reference direction. The reference direction for this measurement shall be the North, positive in a counter-clockwise direction. The AoA is determined at the eNB antenna for an UL channel corresponding to this UE, such determined at multiple antenna 214 of eNB 200 and/or a multiple antenna 234 of eNB 220 as shown in FIG. 2. It is derived at the MAC layer based on Physical layer measurements of the UE's Sounding Reference Symbols (SRS). The AoA is determined at an eNB or base station antenna for an UL channel corresponding to a UE such as UE 100 of FIG. 2. The UE Rx-Tx time difference is a difference in time between a UE uplink PUCCH frame transmission and the first detected path (in time), of the downlink PDCCH or PDSCH frame from the measured radio link.

FIG. 4B illustrates Table 10.2.1-1 of 3GPP TS36.133. As shown in FIG. 4B there is a range mapping of reported ranges for AOA measurement from 0 to 360 degree, with resolution of 0.5 degree. FIG. 4B shows a reported value identifying an AoA_Angle and a measured quantity value of the identified angle. The units of FIG. 4B are in degrees.

Figure 5A:
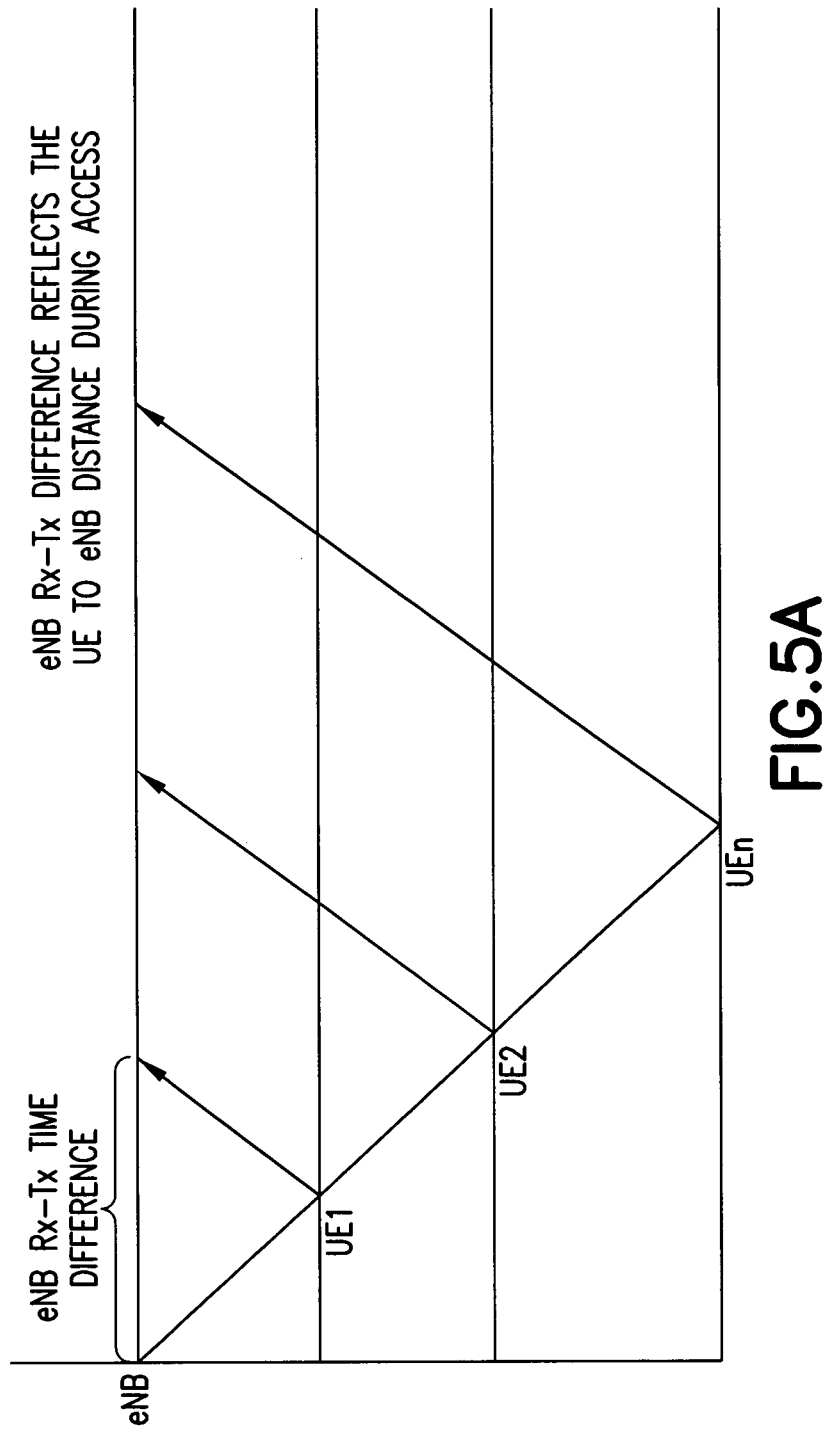
FIGS. 5A and 5B each show a Timing Advance measurements for UE at eNB.
Figure 5B:
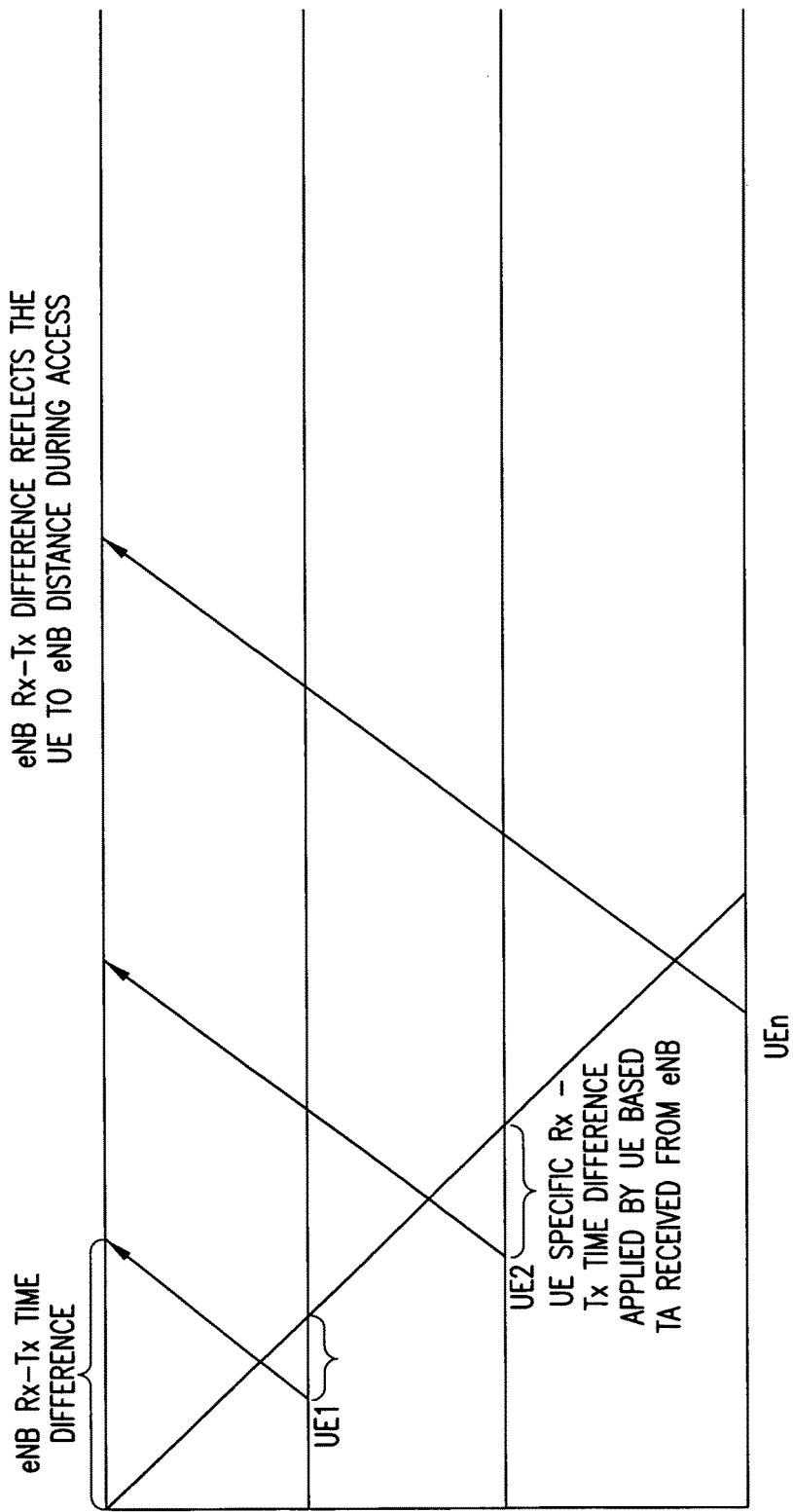

FIGS. 5A and 5B each illustrate UE Rx-Tx Timing differences as are used in accordance with the exemplary embodiments of the invention. The used timing advances can be a Type 1 and/or Type 2 timing advance. FIG. 5A illustrates a Type 2 timing advance scenario. As shown in FIG. 5A the eNB Rx-Tx time difference is shown for each of UE1, UE2, and UEn on the top horizontal line of FIG. 5A. The eNB Rx-Tx difference can be used to represent a distance of each UE from the eNB. FIG. 5B illustrates a Type 1 timing advance scenario. The top horizontal line of FIG. 5B also shows the eNB Rx-Tx time difference. In this Type 1 timing advance scenario the eNB sends a TA value to the UE once the UE is in an RRC Connected State. This leads to UE changing the timing of sending the UL frames. Thus the eNB measured Rx-Tx difference may not be as accurate at reflecting the UE eNB distance such as in the Type 2 scenario. Timing advance measurement will happen when the UEs are in RRC Connected state. As shown with the brackets for each of UE1, UE2, and UEn there is a UE specific Rx-Tx time difference applied by UE based TA received from eNB.

It is noted that for Type 1, the reference Rx path shall be the first detected path (in time) amongst the paths (from the measured radio link) used in the demodulation process.

Type1:

Timing advance ($T_{ADV}$) type 1 is defined as the time difference $T_{ADV}$=(eNB Rx-Tx time difference)+(UE Rx-Tx time difference), where the eNB Rx-Tx time difference corresponds to the same UE that reports the UE Rx-Tx time difference.

For Type 2, the reference Rx path shall be the first detected path (in time) amongst all paths (from the measured radio link) detected by the UE. The reference path used for the measurement may therefore be different for Type 1 and Type 2.

Type2:

Timing advance ($T_{ADV}$) type 2 is defined as the time difference $T_{ADV}$=(eNB Rx-Tx time difference), where the eNB Rx-Tx time difference corresponds to a received uplink radio frame containing PRACH from the respective UE.

Further, the eNB Rx-Tx time difference is defined as T eNB-RX−TeNB-TX. Where: T eNB-RX is the eNB received timing of uplink radio frame #i, defined by the first detected path in time. The reference point for T eNB-RX shall be the Rx antenna connector. T eNB-TX is the eNB transmit timing of downlink radio frame #. The reference point for T eNB-TX shall be the Tx antenna connector.

The reference point for the UE Rx-Tx time difference shall be the antenna connector of the UE, such as for the antenna 264 of UE 100 as shown in FIG. 2. Measurement shall be made for each cell included in the active set.

As similarly stated above the antenna 214, 234, and/or 264 as shown in FIG. 2 can each represent a multiple antenna configuration. In a multiple antenna configuration the antenna 214, 234, and/or 264 can be used by the receivers 212, 232, and/or 262, respectively, of FIG. 2 to derive an AoA and/or Rx-Tx Timing difference for operations in accordance with the exemplary embodiments of the invention.

Once a new neighbor is detected by ANR or manually entered by an operator, in accordance with the exemplary embodiments there is stored the following info regarding the new neighbor:

PCI

Target Cell Info (ECGI)

Uplink AoA for the UE used in ANR procedure

Rx-Tx Time Difference for the UE used ANR procedure

Figure 6:
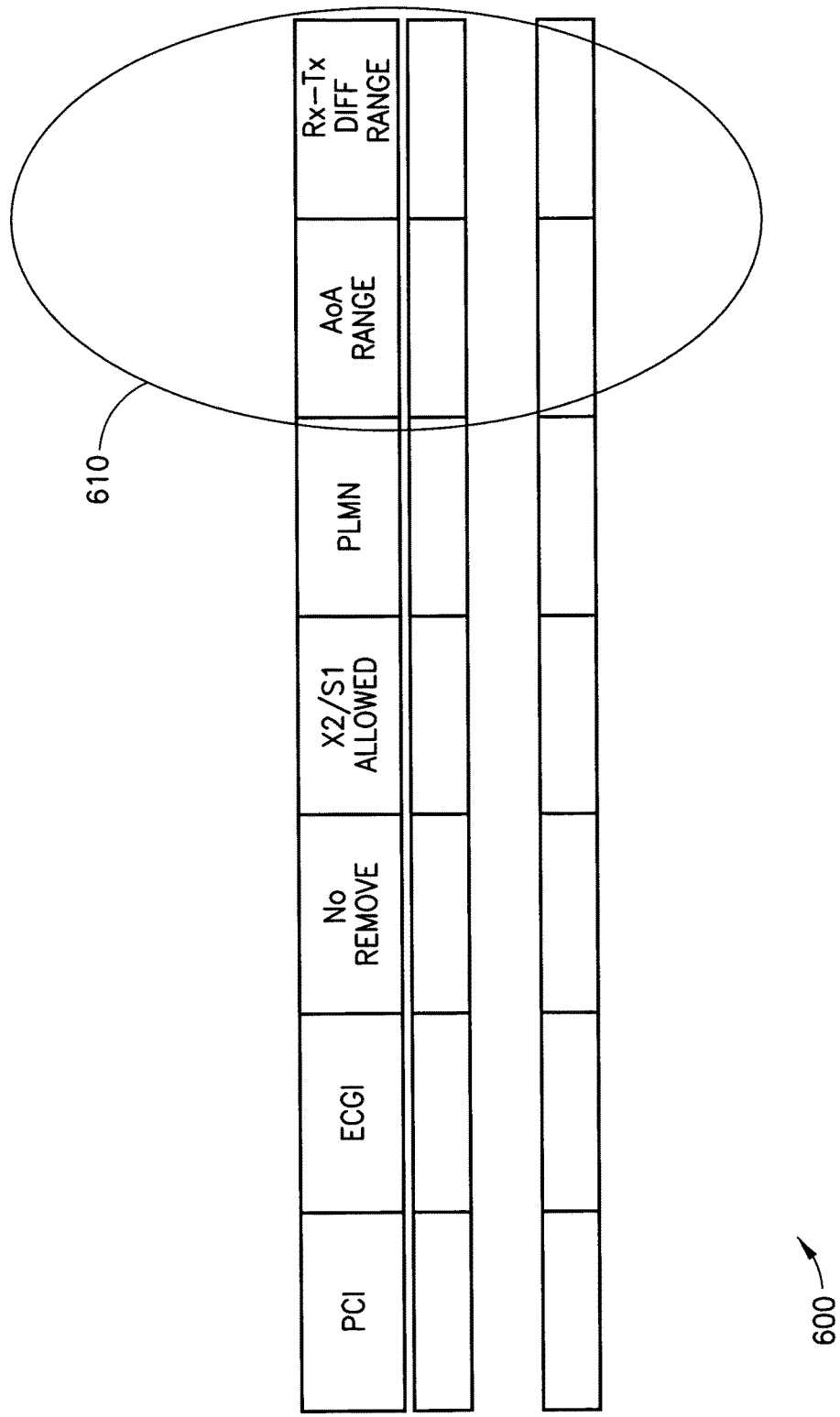
FIG. 6 shows changes proposed to a neighbor relation table in accordance with the exemplary embodiments of the invention.

FIG. 6 shows additional fields of the NRT 600 which are to be added in accordance with the exemplary embodiments of the invention. As shown with the circle 610 of FIG. 6 the NRT fields added include the AoA range and the Rx-Tx diff (difference) field. The remaining field can remain unchanged. Further, it is noted that the placement and identification of these fields in the NRT of FIG. 6 are non-limiting and the new exemplary AoA and Rx-Tx diff Range fields may be named and/or place differently in the NRT.

During handover the current procedures use the UE reported PCI to identify the handover target cell in the neighbor list. The following enhancements are proposed. If the UE reported PCI is in the neighbor list then the eNB performs enhanced checks including:

If the UE's AoA and UE Rx-Tx Time Difference are within the acceptable range to the information stored for this neighbor then handover is initiated to the corresponding target cell. If there are multiple entries for the reported PCI, then the neighbor with best AoA and UE Rx-Tx Time difference is selected.

If the UE's AoA and UE Rx-Tx Time Difference are not within the acceptable range to the information stored for this neighbor then the reported PCI is considered to belong to a different cell than the one in the neighbor list. The eNB then performs ANR procedures to determine the associated target cell Id. Based on the target cell id retrieved using ANR procedure the following actions can be performed:

If the target cell Id matches the stored information in the neighbor list then the stored AoA and UE Rx-Tx Time Difference is appended to the neighbor. The additional AoA/UE Rx-Tx Time Difference info can be used for future PCI translations.

If the target cell does not match the already stored in the neighbor list then new neighbor list entry is created with PCI, Target Cell ID, AoA and UE Rx-Tx Time Difference.

Overtime the neighbor list is updated with Uplink AoA for the UE and Rx-Tx Time Difference for the UE.

This invention allows the network with PCI confusion to continue to operate with no degradation to end user experience and improve handover success rate. This invention also allows the operator to de-prioritize the complex PCI confusion resolution. The exemplary embodiments of the invention provide at least benefits to:

increase the handover success rate when the PCI confusion exists in an area;

reduce the need of resolving PCI confusions if and when arises;

provide more flexibility to the operator to deploy small cells/Femtos with relaxed PCI planning rules (allowing PCI confusion); and allows fast deployment of cell setup for special events (cell on wheels).

The exemplary embodiments of the invention can work to address PCI confusion issues in at least legacy 3GPP, LTE and CDMA operator networks where SON is supported. In SON networks, at least interfaces S1 and X2 are dynamically configured, as well as an IP address and connection to an IP backhaul. To reduce manual work ANR is used. ANR can be used to configure neighbor lists in newly deployed eNBs and for optimizing a list configuration during operation. Dynamic configuration includes the configuration of the Layer 1 identifier, Physical cell identity (PCI) and Cell global ID (CGID). In SON networks the PCI can be assigned either in a centralized or distributed way. When centralized assignment is used the OAM system will have knowledge and control of the PCIs. When a distributed solution is used the OAM system assigns a list of possible PCIs to the newly deployed eNB, but the adoption of the PCI is in control of the eNB. The newly deployed eNB will request a report, sent either by User Equipment (UEs) over the air interface or by other eNBs over the X2 interface, including already in-use PCIs. The eNB can randomly select its PCI from the remaining values. Thus, in a SON network an eNB such as the eNB 200 and/or eNB 220 of FIG. 2 may utilize the method in accordance with the exemplary embodiments to overcome PCI confusion issues. In accordance with the exemplary embodiments of the invention an eNB such as the eNB 200 and/or eNB 220 of FIG. 2 may operate in the SON network to dynamically populate the NRT with the AoA and/or UE Rx-Tx Timing as neighbors are learned of in the SON network.

Figure 7:
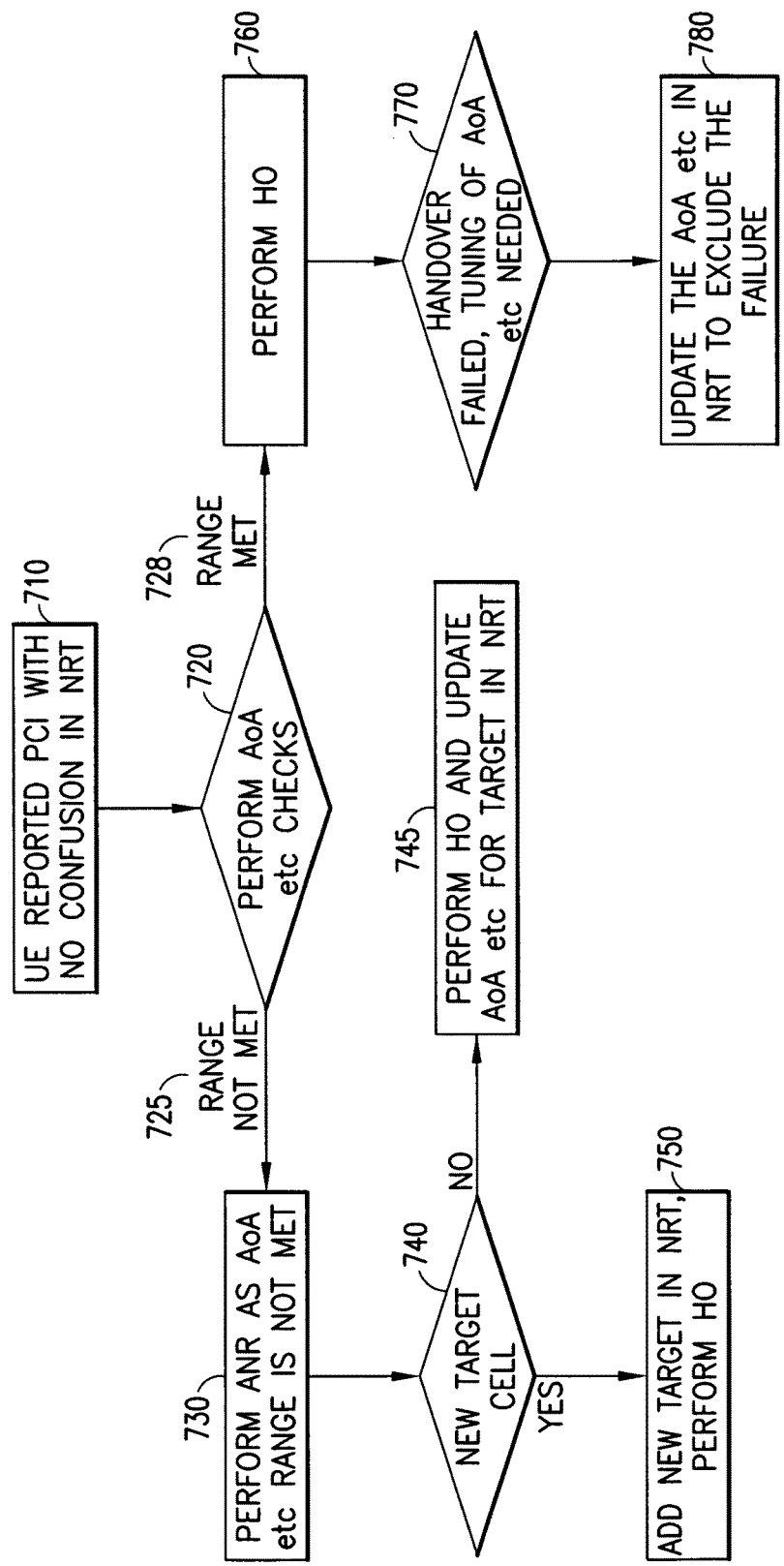
FIG. 7 shows a flow chart of in accordance with the exemplary embodiments of the invention for a case where there is no PCI confusion in the NRT.

FIG. 7 shows one method in accordance with the exemplary embodiments as described herein when it is determined that there is no PCI confusion in the NRT. As shown in FIG. 7 at step 710 a UE has reported a PCI of a cell and there is no PCI confusion in the NRT. Then at step 720 there is performed a check to determine if an AoA and/or UE Rx-Tx Timing measured for the UE meets range requirements for a handover based on information stored in NRT for the reported PCI. If as in step 725 the range is not met then at step 730 a ANR operation is performed to determine the target cell for the reported PCI. At step 740 it is determined whether the reported PCI maps to a new target cell. If no, then at step 745 the handover is performed to the cell with the PCI already stored in the NRT, and the PCI entry in the NRT is appended with at least the AoA and/or UE Rx-Tx Timing of the UE. If yes, then at step 750 the information of the new target cell is added to the NRT and the handover is performed using the new target cell with the AoA and/or UE Rx-Tx Timing of the UE. If as in step 728 the range is acceptable at step 760 the handover is performed. If the handover fails as shown in step 770 there may be tuning of at least the AoA and/or UE Rx-Tx Timing information in the NRT. Then at step 780 a correction to the stored AoA and/or UE Rx-Tx Timing information is applied and updated in the NRT. This prevents future handover operations to the PCI with AoA and/or UE Rx-Tx Timing information measured for the UE which encountered handover failure.

Figure 8:
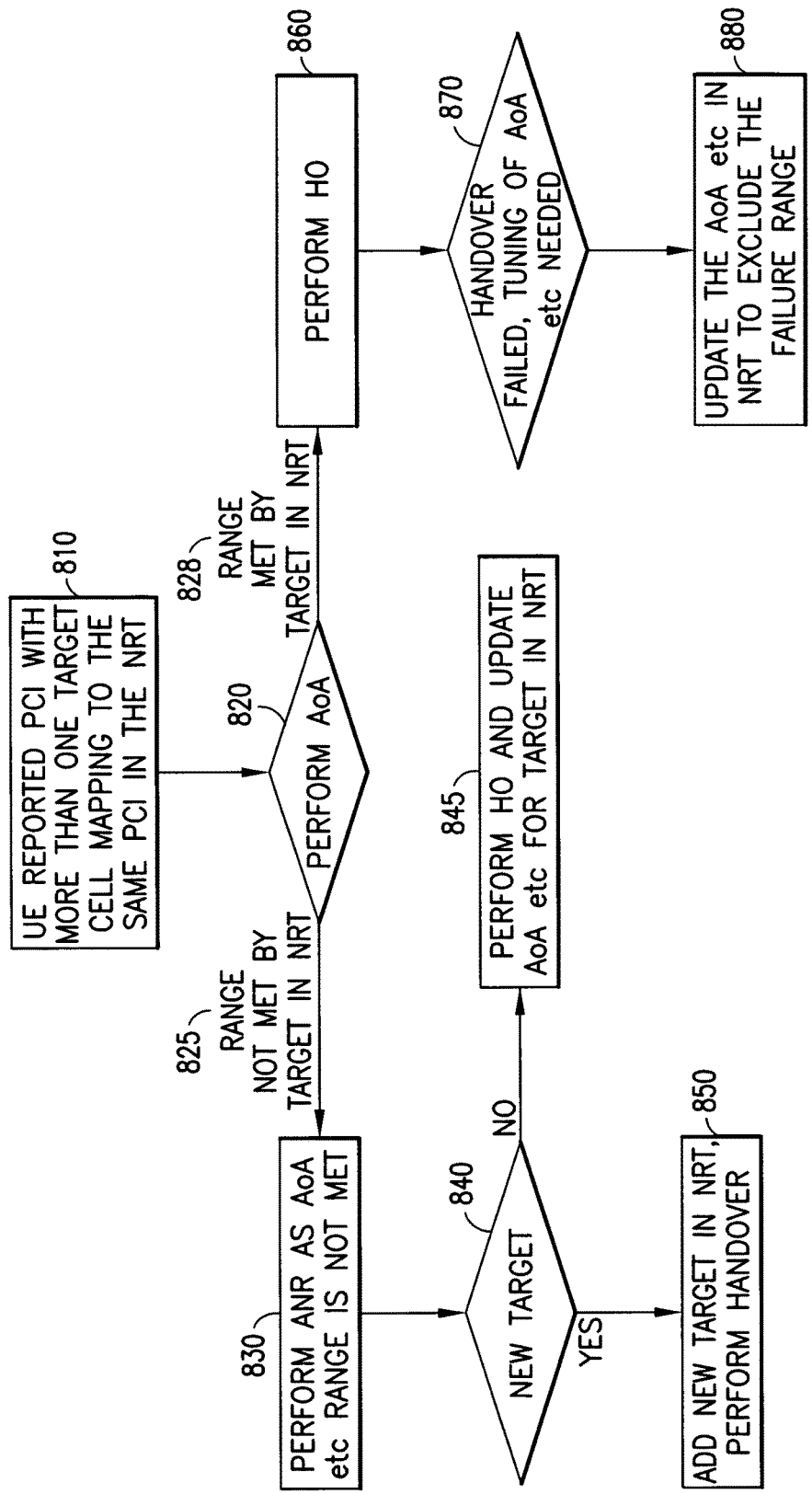
FIG. 8 shows a flow chart of in accordance with the exemplary embodiments of the invention for a case where there is PCI confusion in the NRT.

FIG. 8 shows a method in accordance with the exemplary embodiments as described herein when there is PCI confusion in the NRT. As shown in FIG. 8 at step 810 a UE has reported a PCI of a cell and it is determined that there is PCI confusion in the NRT. Then at step 820 there is performed at least an AoA and/or UE Rx-Tx Timing information check of the UE to determine whether the AoA and/or UE Rx-Tx Timing information is in an acceptable range stored for the same PCI already in the NRT. If as in step 825 the AoA and/or UE Rx-Tx Timing information of a target in the NRT is not in an acceptable range then at step 830 an ANR operation is performed to try to identify the new target cell for the reported PCI. At step 840 it is determined whether the new target cell is identified for the NRT. If no, then at step 845 the handover is performed to the cell with the PCI already stored in the NRT, and the PCI entry in the NRT is appended with at least the AoA and/or UE Rx-Tx Timing information measured for the UE. If yes, than at step 850 the identified new target cell is added to the NRT and AoA and/or UE Rx-Tx Timing information is entered in the NRT for the new target cell. If as in step 828 the AoA and/or UE Rx-Tx Timing information is in an acceptable range of a target in the NRT then at step 860 the handover is performed. If the handover fails as shown in step 870 there may be tuning of at least the AoA and/or UE Rx-Tx Timing information in the NRT. Then at step 880 a correction to the stored AoA and/or UE Rx-Tx Timing information is applied and updated in the NRT. This prevents future handover operations to the PCI with AoA and/or UE Rx-Tx Timing information measured for the UE which encountered handover failure.

In addition, it is noted that operations in accordance with the exemplary embodiments of the invention such as operations based the acceptable range to the information stored as described herein may be using a threshold value. Further, the threshold value may be an integer and preconfigured for a device and/or input to a device such as a device of FIG. 2, which operates in accordance with the exemplary embodiments. Such inputting of threshold values may be performed with received signalling and/or manual entry at the device and/or may be pre-programmed for a device such as a device of FIG. 2.

Figure 9:
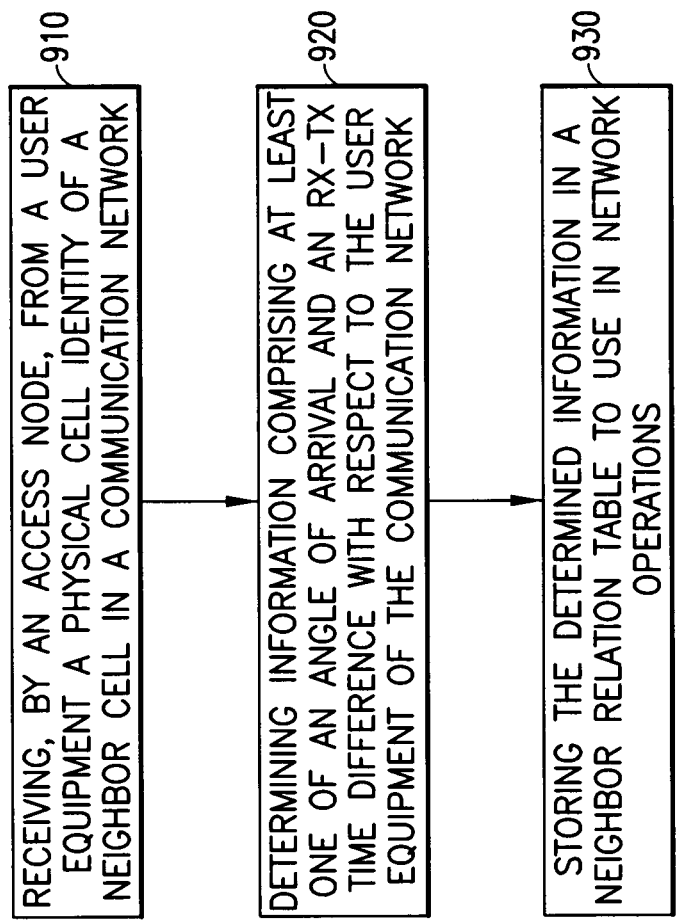
FIG. 9 shows a method in accordance with the exemplary embodiments which may be performed by an apparatus.

FIG. 9 illustrates operations which may be performed by a network device such as, but not limited to, eNB (e.g., the eNB 200 and/or eNB 220 as in FIG. 2). As shown in step 910 of FIG. 9, there is receiving, by an access node, from a user equipment a physical cell identity of a neighbor cell in a communication network; then at step 920 there is determining information comprising at least one of an AoA and a UE Rx-Tx time difference with respect to the user equipment of the communication network. At step 930 there is storing the determined information in a neighbor relation table to use in network operations.

In accordance with the exemplary embodiments as described in the paragraph above, the determining the information comprises the at least one of an AoA and the UE Rx-Tx time difference with respect to the user equipment is using one of a measurement report from the user equipment or a user input provided to the access node.

In accordance with the exemplary embodiments as described in the paragraphs above, there is receiving from the user equipment an indication that the neighbor cell is a handover target for the user equipment; and based the physical cell identity of the neighbor cell being already stored in the network relation table, identifying whether the at least one of an AoA and/or an UE Rx-Tx time difference with respect to the user equipment is within an acceptable range of the at least one of the AoA and the UE Rx-Tx time difference associated with the physical cell identity that is already stored in the neighbor relation table.

In accordance with the exemplary embodiments as described in the paragraphs above, for a case that the at least one of the AoA and/or an UE Rx-Tx time difference with respect to the user equipment is within an acceptable range, there is initiating, by the access node, the handover of the user equipment to the neighbor cell.

In accordance with the exemplary embodiments as described in the paragraphs above, for a case that the handover fails, there is tuning the at least one of the AoA and the UE Rx-Tx time difference associated with the physical cell identity that is already stored in the neighbor relation table.

In accordance with the exemplary embodiments as described in the paragraphs above, for a case that the identified at least one of the AoA and the UE Rx-Tx time difference with respect to the user equipment is not within the acceptable range, there is performing an automatic neighbour relation procedure to identify the handover target.

In accordance with the exemplary embodiments as described in the paragraphs above, for a case the handover target is identified as a new target cell, there is initiating the handover to the new target cell, and adding information of the new target cell comprising the at least one of an AoA and/or an UE Rx-Tx time difference with respect to the user equipment to the neighbor relation table; and for a case the automatic neighbour relation procedure does not identify the handover target as a new target cell, there is initiating the handover to the cell with the physical cell identity that is already stored in the neighbor relation table, wherein the storing comprises appending information comprising the at least one of an AoA and the UE Rx-Tx time difference with respect to the user equipment to information of the cell with the physical cell identity that is already stored in the neighbor relation table.

In accordance with the exemplary embodiments as described in the paragraphs above, there is receiving from the user equipment an indication that the neighbor cell that is a handover target for the user equipment; and based the physical cell identity of the neighbor cell not being already stored in the network relation table, there is identifying whether the at least one of an AoA and the UE Rx-Tx time difference with respect to the user equipment is within an acceptable range for the handover.

In accordance with the exemplary embodiments as described in the paragraphs above, for a case that the at least one of the AoA and the UE Rx-Tx time difference with respect to the user equipment is within the acceptable range for the handover, there is initiating the handover of the user equipment to the neighbor cell.

In accordance with the exemplary embodiments as described in the paragraphs above, for a case that the handover fails, there is at least one of tuning the at least one of the AoA and the UE Rx-Tx time difference associated with the user equipment, and updating the neighbor relation table to associate the at least one of the AoA and the UE Rx-Tx time difference associated with the user equipment with the handover failure.

In accordance with the exemplary embodiments as described in the paragraphs above, for a case that the at least one of the AoA and the UE Rx-Tx time difference with respect to the user equipment is not within an acceptable range for the handover, there is performing an automatic neighbour relation procedure to identify the handover target cell.

In accordance with the exemplary embodiments as described in the paragraphs above, for a case the automatic neighbour relation procedure identifies the handover target cell as a new target cell, there is initiating the handover to the new target, wherein the storing comprises adding the at least one of an AoA and the UE Rx-Tx time difference with respect to the user equipment to the neighbor relation table for the new target.

In accordance with the exemplary embodiments as described in the paragraphs above, the communication network comprises a self-optimizing network and wherein the neighbor relation table is associated with the self-optimizing network.

In accordance with an exemplary embodiment of the invention as described above there is an apparatus comprising: means for receiving, by an access node [eNB 200 or 220], [antenna 214 or antenna 234], [RX 212 or 232], [DP 202 or 222] from a user equipment [UE 100] a physical cell identity of a neighbor cell in a communication network; means for determining information [antenna 214 or antenna 234], [RX 212 or 232], [DP 202 or 222] comprising at least one of an AoA and a UE Rx-Tx time difference with respect to the user equipment of the communication network, and means for storing [DP 202 or 222] [Mem 204 or Mem 224] the determined information in a neighbor relation table to use in network operations.

In the exemplary aspect of the invention according to the paragraph above, wherein the means for receiving comprises [antenna 214 or antenna 234], and the means for determining comprises a non-transitory computer readable medium [MEM 204 and/or 224] encoded with a computer program [PROG 208 and/or 228]; and/or [Data 206 and/or 226] executable by at least one processor [DP 202 or 222].

Further, it is noted that the components of a UE 100 of FIG. 2 are also sufficient means to perform related functions as described above with regards to the eNB 200 and 220.

The apparatus as described above may be, include or be associated with at least one software application, module, unit or entity configured as arithmetic operation, or as a computer program or portions thereof (including an added or updated software routine), executed by at least one operation processor, unit or module. Computer programs, also called program products or simply programs, including software routines, applets and/or macros, may be stored in any apparatus-readable data storage medium. A computer program product may comprise one or more computer-executable components which, when the program is run, are configured to carry out embodiments described above by at least FIG. 9. Additionally, software routines may be downloaded into the apparatus.

The apparatus, such as a node or user device, or a corresponding component, may be configured as a computer or a microprocessor, such as single-chip computer element, or as a chipset, including or being coupled to a memory for providing storage capacity used for software or arithmetic operation(s) and at least one operation processor for executing the software or arithmetic operation(s).

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   receiving, by an access node, from a user equipment a physical cell identity of a neighbor cell in a communication network;
   determining information comprising at least one of an angle of arrival and a UE Rx-Tx time difference with respect to the user equipment of the communication network, wherein determining the information is using one of a measurement report from the user equipment or a user input provided to the access node;
   storing the determined information in a neighbor relation table to use in network operations
   receiving from the user equipment an indication that the neighbor cell is a handover target for the user equipment;
   based the physical cell identity of the neighbor cell being already stored in the network relation table, identifying whether the at least one of the angle of arrival and the UE Rx-Tx time difference with respect to the user equipment is within an acceptable range of the at least one of the angle of arrival and user equipment Rx-Tx time difference associated with the physical cell identity that is already stored in the neighbor relation table, wherein the UE Rx-Tx time difference is a difference in time between a physical uplink control channel frame transmission and a first detected path of one of a physical downlink control channel or physical downlink shared channel frame; and
   for a case that it is identified that the at least one of the angle of arrival and the UE Rx-Tx time difference with respect to the user equipment is within an acceptable range, initiating, by the access node, the handover of the user equipment to the neighbor cell.

2. The method of claim 1, wherein determining the UE Rx-Tx time difference is using Rx-Tx timing information received by the access node from the communication network.

3. The method of claim 1, wherein for a case that the handover fails, the method comprising: tuning the at least one of the angle of arrival and the LTE Rx-Tx time difference associated with the physical cell identity that is already stored in the neighbor relation table.

4. The method of claim 1, wherein for a case that the identified at least one of the angle of arrival and the UE Rx-Tx time difference with respect to the user equipment is not within the acceptable range, the method comprising performing an automatic neighbour relation procedure to identify the handover target.

5. The method of claim 4, comprising:
   for a case the handover target is identified as a new target cell, initiating the handover to the new target cell, and adding information of the new target cell comprising the at least one of an angle of arrival and a UE Rx-Tx time difference with respect to the user equipment to the neighbor relation table; and
   for a case the automatic neighbour relation procedure does not identify the handover target as a new target cell, initiating the handover to the cell with the physical cell identity that is already stored in the neighbor relation table, wherein the storing comprises appending information comprising the at least one of the angle of arrival and the UE Rx-Tx time difference with respect to the user equipment to information of the cell with the physical cell identity that is already stored in the neighbor relation table.

6. The method of claim 1, comprising:
   based the physical cell identity lookup in the network relation table there is a plurality of target cells which match the reported physical cell identity of the neighbor cell already stored in the network relation table, identifying whether the at least one of an angle of arrival and the UE Rx-Tx time difference with respect to the user equipment is within an acceptable range for the handover for one of multiple target cells.

7. The method of claim 6, comprising:
   for a case that the at least one of the angle of arrival and the UE Rx-Tx time difference with respect to the user equipment is within the acceptable range for the handover for one of multiple target cells, initiating the handover of the user equipment to the neighbor cell.

8. The method of claim 7, comprising:
   for a case that the handover fails, at least one of tuning the at least one of the angle of arrival and the UE Rx-Tx time difference with respect to the user equipment, and updating the neighbor relation table to associate the at least one of the angle of arrival and the UE Rx-Tx time difference with respect to the user equipment with the handover failure.

9. The method of claim 6, comprising:
for a case that the at least one of the angle of arrival and the UE Rx-Tx time difference with respect to the user equipment is not within an acceptable range for the handover on all the existing target cells which match the reported physical cell identity in the network relation table, performing an automatic neighbour relation procedure to identify the handover target cell.

10. The method of claim 9, comprising:
for a case the handover target is identified as a new target cell, initiating the handover to the new target cell, and adding information of the new target cell comprising the at least one of an angle of arrival and the UE Rx-Tx time difference with respect to the user equipment to the neighbor relation table; and
for a case the automatic neighbour relation procedure does not identify the handover target as a new target cell, initiating the handover to the cell with the physical cell identity that is already stored in the neighbor relation table, wherein the storing comprises appending information comprising the at least one of an angle of arrival and the UE Rx-Tx time difference with respect to the user equipment to information of the cell with the physical cell identity that is already stored in the neighbor relation table.

11. A non-transitory computer readable medium embodying computer program code, the computer program code executed by at least one processor to perform the method according to claim 1.

12. An apparatus comprising:
at least one processor; and
at least one memory including computer program code, where the at least one memory and the computer program code are configured, with the at least one processor, to cause the apparatus to at least:
receive from a user equipment a physical cell identity of a neighbor cell in a communication network;
determine information comprising at least one of an angle of arrival and a UE Rx-Tx time difference with respect to the user equipment of the communication network wherein the determining is using one of a measurement report from the user equipment or a user input provided to the apparatus;
store the determined information in a neighbor relation table to use in network operations;
receive from the user equipment an indication that the neighbor cell is a handover target for the user equipment;
based the physical cell identity of the neighbor cell being already stored in the network relation table, identify whether the at least one of the angle of arrival and the UE Rx-Tx time difference with respect to the user equipment is within an acceptable range of the at least one of the angle of arrival and UE Rx-Tx time difference associated with the physical cell identity that is already stored in the neighbor relation table, wherein the UE Rx-Tx time difference is a difference in time between a physical uplink control channel frame transmission and a first detected path of one of a physical downlink control channel or physical downlink shared channel frame; and
for a case that the at least one of the angle of arrival and the UE Rx-Tx time difference with respect to the user equipment is within an acceptable range, initiate the handover of the user equipment to the neighbor cell.

13. The apparatus of claim 12, wherein the at least one memory including the computer program code is configured with the at least one processor to cause the apparatus to:
for a case that the handover fails, tuning the at least one of the angle of arrival and the UE Rx-Tx time difference associated with the physical cell identity that is already stored in the neighbor relation table.

14. The apparatus of claim 12, wherein the at least one memory including the computer program code is configured with the at least one processor to cause the apparatus to:
for a case that the identified at least one of the angle of arrival and the UE Rx-Tx time difference with respect to the user equipment is not within the acceptable range, perform an automatic neighbour relation procedure to identify the handover target.

15. The apparatus of claim 14, wherein the at least one memory including the computer program code is configured with the at least one processor to cause the apparatus to:
for a case the handover target is identified as a new target cell, initiate the handover to the new target cell, and adding information of the new target cell comprising the at least one of an angle of arrival and a UE Rx-Tx time difference with respect to the user equipment to the neighbor relation table; and
for a case the automatic neighbour relation procedure does not identify the handover target as a new target cell, initiate the handover to the cell with the physical cell identity that is already stored in the neighbor relation table, wherein the storing comprises appending information comprising the at least one of the angle of arrival and the UE Rx-Tx time difference with respect to the user equipment to information of the cell with the physical cell identity that is already stored in the neighbor relation table.

16. The apparatus of claim 12, wherein the at least one memory including the computer program code is configured with the at least one processor to cause the apparatus to:
based the physical cell identity of the neighbor cell not being already stored in the network relation table, identify whether the at least one of the angle of arrival and the UE Rx-Tx time difference with respect to the user equipment is within an acceptable range for the handover.

17. The apparatus of claim 16, comprising:
for a case that the at least one of the angle of arrival and the UE Rx-Tx time difference with respect to the user equipment is within the acceptable range for the handover, initiating the handover of the user equipment to the neighbor cell.

18. The apparatus of claim 17, wherein the at least one memory including the computer program code is configured with the at least one processor to cause the apparatus to:
for a case that the handover fails, at least one of tune the at least one of the angle of arrival and the UE Rx-Tx time difference associated with the user equipment, and update the neighbor relation table to associate the at least one of the angle of arrival and UE Rx-Tx time difference associated with the user equipment with the handover failure.

19. The apparatus of claim 16, wherein the at least one memory including the computer program code is configured with the at least one processor to cause the apparatus to:
for a case that the at least one of the angle of arrival and the UE Rx-Tx time difference with respect to the user equipment is not within an acceptable range for the handover, perform an automatic neighbour relation procedure to identify the handover target cell.

20. The apparatus of claim 19, wherein the at least one memory including the computer program code is configured with the at least one processor to cause the apparatus to:
for a case the automatic neighbour relation procedure identifies the handover target cell as a new target cell, initiate the handover to the new target, wherein the storing comprises adding the at least one of the angle of arrival and the UE Rx-Tx time difference with respect to the user equipment to the neighbor relation table for the new target.

* * * * *

UNITED STATES PATENT AND TRADEMARK OFFICE
CERTIFICATE OF CORRECTION

| | | |
|---|---|---|
| PATENT NO. | : 9,781,640 B2 | Page 1 of 1 |
| APPLICATION NO. | : 14/548484 | |
| DATED | : October 3, 2017 | |
| INVENTOR(S) | : Venkataramanan Narayanan and Vivek Naik | |

It is certified that error appears in the above-identified patent and that said Letters Patent is hereby corrected as shown below:

In the Claims

In Claim 3:
Column 14, Line 23, "LTE" should be deleted and --UE-- should be inserted.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*